July 16, 1968     R. R. REED     3,392,546
EXHAUST SYSTEM FOR SPLIT WINDOW UNIT
Filed Oct. 14, 1966     2 Sheets-Sheet 1
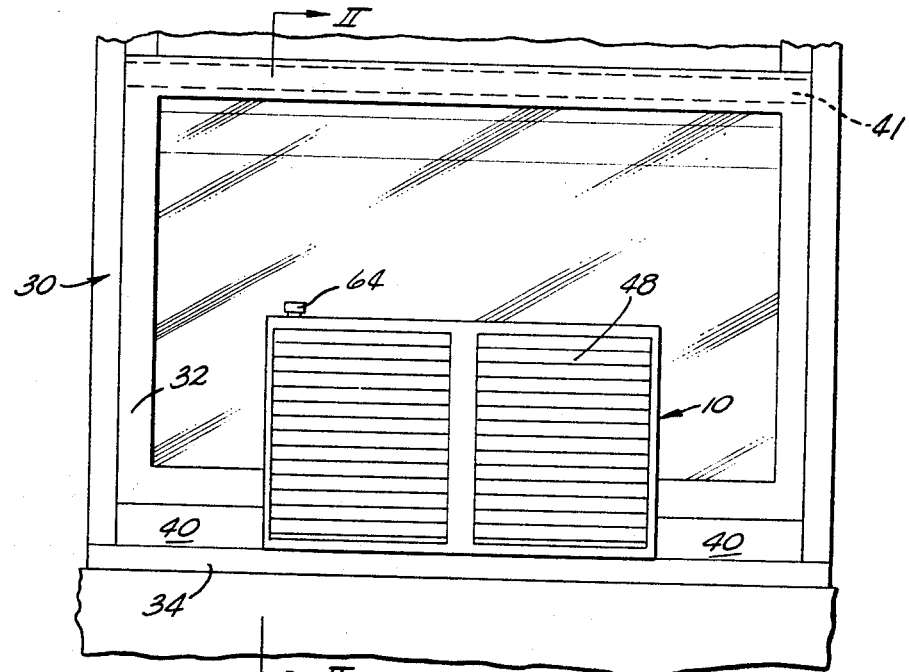
FIG. 1
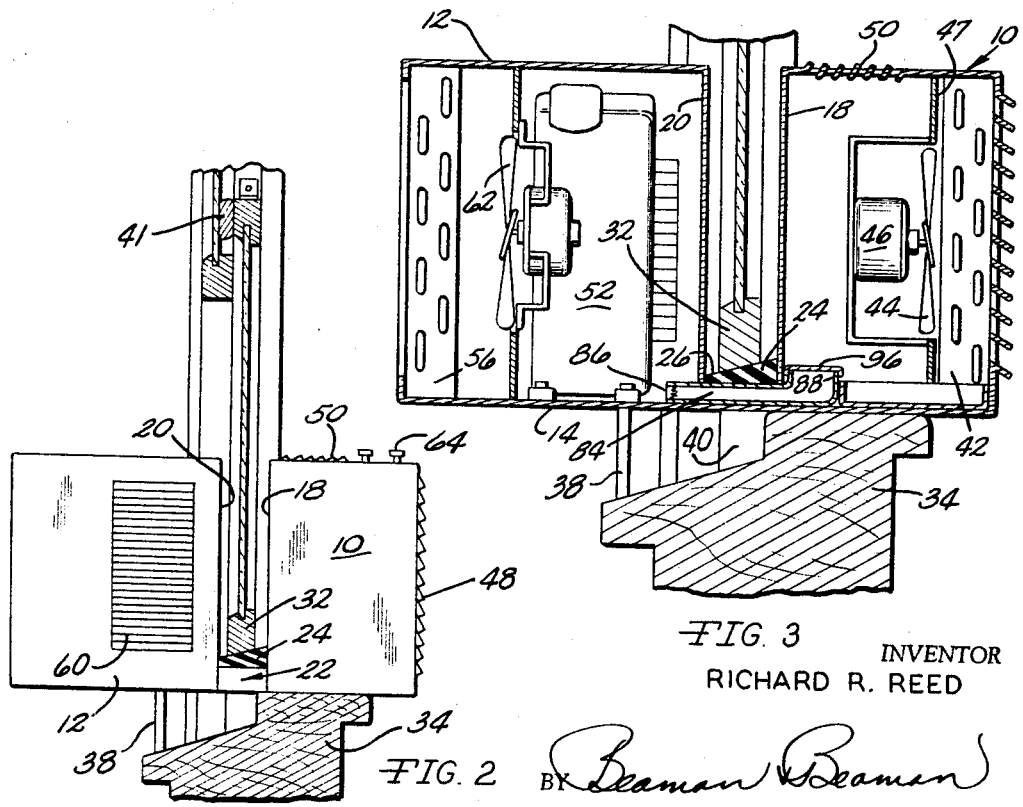
FIG. 2
FIG. 3
INVENTOR
RICHARD R. REED
BY Beaman & Beaman
ATTORNEYS July 16, 1968  R. R. REED  3,392,546
EXHAUST SYSTEM FOR SPLIT WINDOW UNIT
Filed Oct. 14, 1966  2 Sheets-Sheet 2
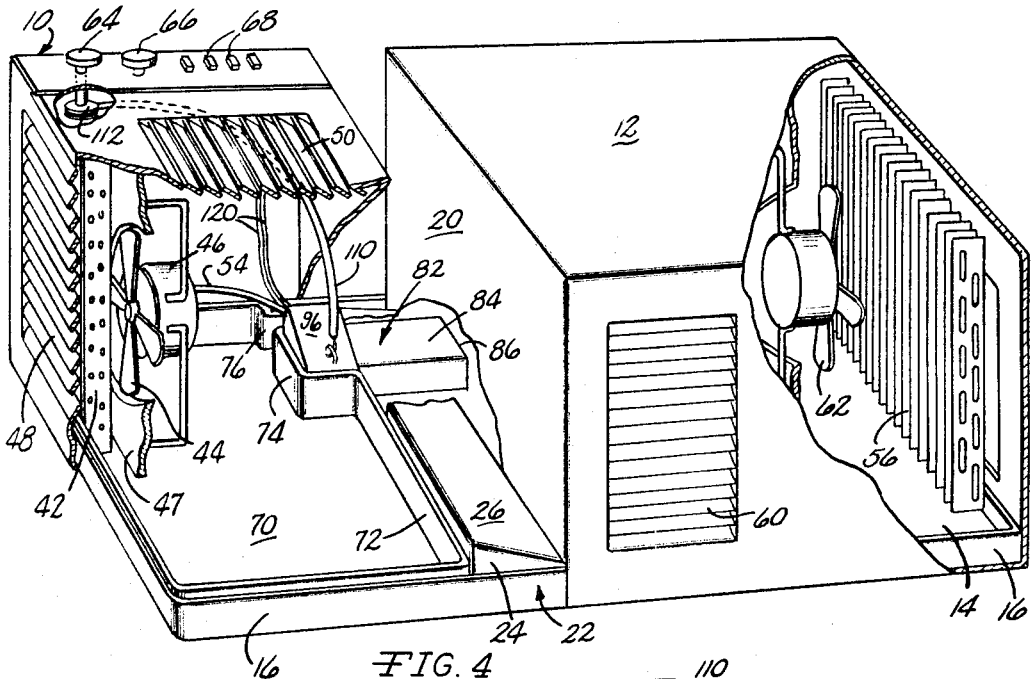
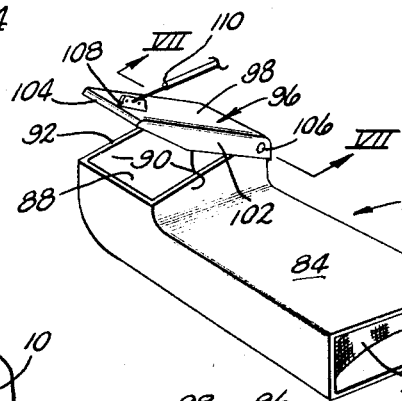
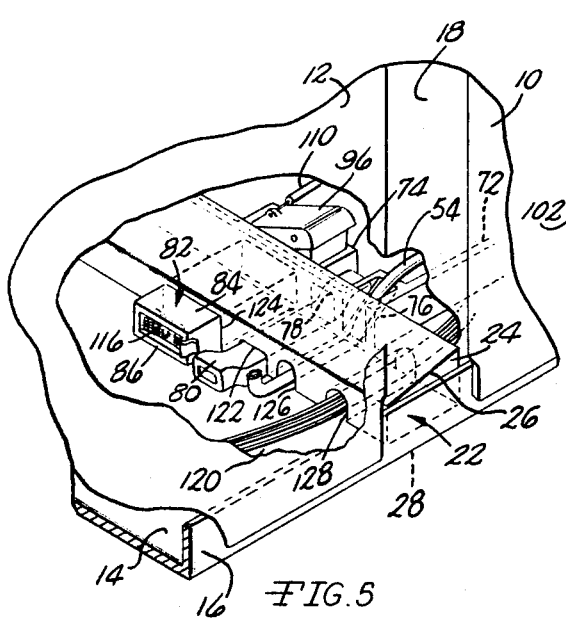
INVENTOR
RICHARD R. REED
BY Beaman & Beaman
ATTORNEYS

United States Patent Office 3,392,546
Patented July 16, 1968

3,392,546
EXHAUST SYSTEM FOR SPLIT WINDOW UNIT
Richard R. Reed, Addison, Mich., assignor to Addison Products Company, Addison, Mich., a corporation of Michigan
Filed Oct. 14, 1966, Ser. No. 586,865
8 Claims. (Cl. 62—262)

ABSTRACT OF THE DISCLOSURE

An exhaust system for window air conditioning units of the type in which a wall opening closure is substantially disposed between a pair of heat exchanger housings. A connector is provided between the housings and the exhaust of air takes place at and across the location of the connector.

---

The invention pertains to an exhaust system for window air conditioning units and particularly relates to an exhaust system for units of this type wherein separate, but connected, condenser and evaporator housings are employed such as disclosed in United States Patent 2,604,763 wherein the compressor and condenser components of the required refrigeration system are mounted in one housing and the living spacer air circulation fan and evaporator are located in a separate housing, and the two housings are interconnected by a connector section.

The split window air conditioning unit of the type described above has several important advantages over the more conventional unit construction. Perhaps, the most important advantage lies in the fact that as the compressor, condenser, and condenser fan are located outside the living space, and the window forms a barrier between these components and the living space, the noise generated by the compressor and the condenser fan is not transmitted to the living space. Only the fan associated with the evaporator is located within the living space and, thus, the noise generated by the air conditioning unit discernible within the living space is minimized. Another important advantage of the split-type air conditioning unit arises from the fact that the window can be located between the condenser and evaporator housing in a position which approaches the normal closed position. Thus, an attractive and concise unit configuration within the living space is provided and the unit installation permits much more light to pass through the window in which the unit is installed than in the more conventional arrangement wherein usually opaque panels of a vertical dimension equal to that of the unit housing are employed.

It is desirable that ventilating means be provided in window installation units whereby the air within the living space can be periodically changed. The invention is basically concerned with a ventilating system for use with split-type window air conditioning units, and it is an object of the invention to provide such a ventilating system wherein air may be exhausted from the evaporator housing into the condenser housing through conduit means located within the connector section.

Another object of the invention is to provide a window ventilating system for split window air conditioning units wherein the ventilating system may be incorporated in the relatively limited dimension of the connector section interconnecting the condenser and evaporator housings, and associates with sealing means located within the connector section.

Another object of the invention is to provide a ventilating system for a split-type window air conditioning unit which is economical to manufacture, relatively inert to corrosive influences, and easily installed and assembled into the unit.

An additional object of the invention is to provide a ventilating system for split-type window air conditioning units wherein a drain pan is associated with the lower region of the evaporator housing, and the ventilating system is associated with the drain pan in such a manner that liquid within the drain pan cannot enter the ventilating system, and the ventilating system is located outside the confines of the drain pan.

A further object of the invention is to provide a ventilating system for a split-type air conditioning unit wherein the system includes a formed conduit of a synthetic, plastic material having a pivoted cover located at the inlet opening of the conduit and having an insect screen defined at the outlet end of the conduit, and wherein operating means for the cover may be of the remotely operated type.

These and other objects of the invention arising from the relationships and details of components of an embodiment thereof will be apparent from the following description and accompanying drawings wherein:

FIG. 1 is a front, elevational view of a split-type window air conditioning unit in accord with the invention as installed in a window opening, FIG. 2 is an elevational, sectional view of the installation of FIG. 1 as taken along section II—II thereof, FIG. 3 is an elevational, sectional, enlarged, detail view through a split-type window air conditioning unit, as taken through the ventilating conduit, FIG. 4 is a perspective, partially sectioned view of a split-type air conditioning unit in accord with the invention, showing the ventilating system cover in the closed position, FIG. 5 is an enlarged, detail, perspective view of the association of the ventilating system, drain tube, refrigeration tube and wiring, illustrating the relationship of these components to the connector section seal, FIG. 6 is a perspective view of the ventilating conduit, per se, showing the cover in an open position, and FIG. 7 is an elevational, sectional, enlarged, detail view taken along section VII—VII of FIG. 6, illustrating the cover hinge structure.

Basically, a window air conditioning unit in accord with the invention consists of an evaporator cabinet or housing 10, and a condenser cabinet or housing 12. The housings 10 and 12 may be mounted upon a conventional base plate 14, FIG. 5, having short vertically extending side walls 16, and the opposed inner walls 18 and 20 of the evaporator housing and condenser housing, respectively, are spaced apart a sufficient distance to permit a window frame to be received therein, as is apparent from FIG. 3. That portion of the base plate 14 in vertical alignment with the spacing between the walls 18 and 20 is hereinafter termed a connector section 22. A divider seal 24 having an obliquely disposed upper surface 26 and a lower surface 28 adapted to engage the base plate 14 is located on the base plate at the connector section 22 and the vertical dimension of the seal defines the effective vertical dimension of the connector section 22. Preferably, the seal 24 is formed of expanded bead polystyrene.

The split air conditioning unit in accord with the invention is installed in a manner which will be apparent from FIGS. 1 through 3. In these figures, a window opening of a living space is generally indicated at 30, having a double hung window located therein including a lower frame 32. The unit base plate 14 is disposed adjacent the window sill 34 and may be directly rested upon the sill, if desired. The unit is related to the opening 30 so that the evaporator housing 10 is located within the living space and the condenser housing 12 is located in the exterior atmosphere. The housing walls 18 and 20 are related to the lower frame 32 of the window so that the lower portion may be received between the side walls for engagement with the upper surface 26 of the seal 24, FIG. 3.

Normally, auxiliary supports 38 will be interposed between the outer portion of the windowsill and the condenser housing 12 to support the weight of the condenser housing.

A small opening will exist between the sill 34 and the lower portion of the window frame 32 on each side of the unit, assuming the unit is centrally mounted in the window opening, as shown in FIG. 1, and these openings are closed by the insertion of small panels 40. Preferably, the panels 40 are formed of an attractive and compressible material, such as sponge rubber or synthetic foam, which will seal these openings against the entrance of exterior air or rain.

The above described procedure completes the installation of the air conditioning unit, and the window opening 30, when the usual sealing strip 41 is installed, will be completely sealed. It will be noticed from FIGS. 2 and 3 that the lower frame 32 of the window provides the primary barrier between the evaporator housing 10 and the condenser housing 12.

The evaporator housing 10 contains an evaporator coil 42 and a fan 44 driven by an electric motor 46 supported on a baffle partition 47. The coil 42 is disposed adjacent louvers 48 located in the front wall of the evaporator housing and outlet louvers 50 are located in the upper housing portion. The fan 44 rotates in a direction which draws air into the housing 10 through the louvers 48 and ejects the air through the louvers 50. Thus, a superatomspheric pressure is produced within the housing 10 at the left of the fan 44 and partition 47, FIG. 3.

The condenser housing 12 contains the refrigeration compressor 52 which is connected to the coil 42 by a refrigerant tube 54, FIG. 5. The housing 12 also includes the condenser coil 56 disposed adjacent an opening defined in the outer housing wall. Louvers 60 are defined in the side wall of the housing 12, FIG. 4, and the fan 62 rotates in a direction to expel air from the housing through the coil 56 and louvers 58 and draw air into the housing 12 through the louvers 60. Thus, a subatmospheric pressure is formed within the housing 12 at the right of the fan 62, FIG. 3.

Suitable controls to regulate the operation of the unit are mounted upon the housing 10 within the living space. Such controls may include knobs 64 and 66 and push button switches 68.

As the cooling of the air entering the evaporator housing 10 often forms moisture due to condensation, a drain pan 70 is located in the lower region of the evaporator housing. Preferably, this drain pan is formed of a pressed styrofoam expanded bead material as to be noncorrosive and waterproof. The drain pan 70 is of a configuration which permits the pan to be disposed below the coil 42 and is formed with a rear wall 72 having an offset portion 74 defining a rectangular inset outside the confines of the drain pan in which the ventilating conduit may be received, as will be later described. Drain pan 70 also includes an inclined baffle 76, FIG. 5, to provide clearance for the refrigerant tube 54. An opening 78 is defined in the drain pan to receive the drain tube 80. Suitable material is used to seal the tube 80 in the opening 78. The drain tube 80 consists of a synthetic, plastic conduit having the ends thereof disposed at a higher elevation than the central portion, FIG. 5. Thus, fluid will be trapped within the tube 80 of a depth sufficient to prevent the flow of air or entrance of insects through the drain tube. However, upon the depth of the liquid within the drain pan 70 sufficiently rising, the fluid will flow through the tube 80 from the drain pan 70 into the condenser housing 12 where it will evaporate.

The configuration of the ventilating apparatus will be best appreciated from FIG. 6. The ventilating apparatus includes a conduit generally indicated at 82 which is formed with a horizontally disposed portion 84 of a rectangular cross-sectional configuration. The portion 84 terminates in the rectangular outlet opening 86. The other end of the conduit 82 is formed of an L-shape defining an upwardly shaped inlet opening 88. The conduit inlet includes upwardly extending wall portions 90 which define the rectangular cross-sectional inlet opening, and the wall portions terminate in the upward direction at an upwardly disposed edge 92 to define the inlet opening. The edge 92 is obliquely related to the horizontal, as is apparent in FIG. 6, and a pair of holes 94, FIG. 7, are formed in opposed wall portions 90.

The inlet opening 88 is selectively opened and closed to the flow of air therethrough by a cover 96. The cover includes a planar portion 98 having an undersurface 100. The lateral portions are tapered toward the front edge 104 of the cover. The cover flanges each include an integral projection 106 formed of the material of the flanges which are inwardly disposed toward each other and are adapted to be received within the holes 94. Preferably, the conduit 82 and the cover 96 are formed of a synthetic, plastic material such as polyethylene which is moldable and semi-rigid, yet, the somewhat flexible nature of the flanges 102 permits the projections 106 to be received within the holes 94 to pivotally connect the cover to the conduit at the inlet opening 88.

An upstanding projection 108 is integrally defined on the upper surface of the cover portion 98 and has several holes defined therein whereby the operating wire 110 for the cover may be selectively affixed thereto. The wire 110 is operatively connected to a control wheel 112 operated by the knob 68 whereby rotation of the knob permits the cover to be pivoted between the closed position of FIGS. 4 and 5 to the open position of FIG. 6.

A sheet of foam material 114, such as polyurethane foam, is glued to the undersurface 100 of the cover 96 and will engage the upper edge 92 of the opening 88 when the cover is in the closed position. Thus, the foam 114 will function as a gasket and will also serve to dampen vibrations which may occur in the cover as air flows through the inlet opening.

The outlet opening 86 of the conduit is preferably provided with insect-barring screen means of the type shown in FIG. 6. The screen 116 is of a rectangular configuration having a height dimension substantially equal to the height of the outlet opening. The longitudinal length of the screen is considerably greater than the horizontal width of the outlet opening whereby the screen is bent in the arcuate configuration shown in FIG. 6 and formed around one end of the opening 86. A resilient clip 118 retains the screen adjacent the end of the conduit in the outlet opening. Thus, the screen 116 will prevent insects from entering the evaporator housing 10 through the conduit 82.

The conduit 82 is positioned in the air conditioning unit in the manner apparent from FIGS. 3, 4 and 5. The conduit 82 rests upon the base plate 14 and the vertically extending portion of the conduit defining the inlet opening 88 is positioned within the offset portion 74 defined in the drain pan 70. Thus, the inlet opening 88 will be located within the evaporator housing 10. The conduit portion 84 will extend across the connector section 22 and the outlet opening 86 terminates within the condenser housing 12.

The divider seal 24 is provided with several transversely disposed recesses which intersect the bottom surfact 28 of the seal. Thus, when the drain tube 80, conduit 82, tube 54 and wiring 120 are properly positioned, the seal 24 may be placed in its position without interference with the aforementioned components which extend across the connector section. The drain tube 80 is received within the seal recess 122. The conduit 82 is received within the rectangular recess 124 defined in the seal, and recesses 126 and 128 accommodate the tube 54 and wiring 120, respectively.

When it is desired to exhaust air from the living space, the operator will actuate the knob 64 to pivot the cover 96 to the open position, as shown in FIG. 6. Thus, as the inlet opening 88 is located in that portion of the evaporator housing 10 in which the superatmospheric pressure condition exists due to the airflow produced by the fan 44, air will be forced from the housing 10 through the conduit 82 into the condenser housing 12. This flow of air from the evaporator housing to the condenser housing is augmented by the fact that the outlet 86 of the conduit 82 is located within that portion of the condenser housing 12 wherein the subatmospheric condition occurs. Thus, rapid airflow through the conduit 82 can be provided, in that the airflow is from a superatmospheric condition to a subatmospheric environment. The cover 96 may be readily closed upon the inlet opening 88 by operation of the knob 64 and, thus, the degree of ventilation occurring may be readily adjusted.

In that the vertical dimension of the conduit 82 is less than the vertical dimension of the seal 24, it is appreciated that the above described ventilating apparatus can be readily employed with the split-type air conditioning unit without requiring modification of the basic advantageous configuration of the split unit. The fact that the inlet opening 88 is disposed in an upward direction facilitates the entrance of air therein and as the upper edge 92 is located above the upper edge of the drain pan 70, the drain pan will not interfere with the flow of air through the conduit. By obliquely relating the inlet opening edge 92 to the horizontal entrance of air into the conduit 82 is aided and although the relative size of the conduit 82 is rather small, a substantial airflow through the conduit is possible due to its configuration and the conduit's relationship to the superatmospheric and subatmospheric conditions within the respective housings.

It is appreciated that various modifications to the invention may be apparent to those skilled in the art without departing from the spirit and scope thereof, and it is intended that the invention be defined only by the scope of the following claims.

I claim:

1. In combination with apparatus for cooling and ventilating living space of the type having first and second heat exchanger housings disposable on opposite sides of a wall opening with said housings being separated from each other throughout the major portion of their vertical projections and having a narrow connector section common to said housings, whereby wall opening closure means may be substantially disposed between said housings without interference with said connector section, said first heat exchanger housing adapted to be located in said living space and said second heat exchanger housing adapted to be located exteriorly of said living space, of a self-contained ventilating conduit transversely disposed across said connector section having first and second openings defined therein, said first opening being located within the interior of said first heat exchanger housing and said second opening being located within the interior of said second heat exchanger housing, and a closure associated with at least one of said openings adapted to selectively permit the flow of air through said conduit and closure operating means connected to said closure.

2. In combination with apparatus as in claim 1 wherein an elongated seal is located in said connector section, said seal having an upper surface adapted to be engaged by the wall opening closure means and a bottom surface, a recess defined in said seal intersecting said bottom surface and longitudinally extending toward said first and second heat exchanger housing, said conduit being received within said recess.

3. In combination with apparatus as in claim 1 wherein said conduit first opening is disposed in an upward, vertical direction by spaced wall structure, said closure comprising a cover having a lateral edge, a flange depending from said lateral edge and hinge structure for said cover integrally formed from the material of said flange and wall structure to hinge said cover to said conduit adjacent said first opening for controlling air flow therethrough.

4. Apparatus for cooling and ventilating living space comprising, in combination, first and second heat exchanger cabinets each having upper and lower portions and separated from each other throughout the major portion of their vertical projections, a connector section interconnecting said cabinets, said connector section being of shallow vertical projection relative to the vertical projection of said cabinets, inlet and outlet air passages defined in each of said cabinets and opening into the interior thereof, a first fan located within said first cabinet drawing air into said first cabinet and creating a superatmospheric pressure therein, a second fan located within said second cabinet expelling air from said second cabinet creating a subatmospheric pressure therein, an exhausting conduit having an inlet opening located in said first cabinet and an outlet opening located within said second cabinet, said conduit being disposed across said connector section and extending between the air passages of said cabinet, a closure associated with at least one of said openings adapted to control the flow of air through said conduit and closure operating means connected to said closure.

5. Apparatus for cooling and ventilating living space as in claim 4 wherein said closure comprises a cover pivotally mounted on said conduit adjacent said inlet opening, and an insect barring screen located at said conduit outlet opening.

6. Apparatus for cooling and ventilating living space as in claim 4 wherein an elongated seal having an upper surface and a lower surface is located within said connector section, a recess defined in said seal transversely disposed to the length thereof and intersecting said seal lower surface, said exhausting conduit being received within said recess.

7. Apparatus for cooling and ventilating living space as in claim 4 wherein said cabinets are interconnected by said connector section at the lowermost portions of said cabinets, a drain pan having an upper edge disposed in the lowermost portion of said first cabinet, said exhausting conduit inlet opening being located adjacent said drain pan and vertically disposed above said upper edge thereof.

8. Apparatus for cooling and ventilating living space as in claim 4 wherein said exhaust conduit and said closure are formed from a synthetic, plastic material relatively inert with respect to corrosion from exposure to moisture.

References Cited

UNITED STATES PATENTS

| | | | |
|---|---|---|---|
| 3,152,456 | 10/1964 | Prendergast | 62—262 |
| 3,271,972 | 9/1966 | Knight | 62—262 |

WILLIAM J. WYE, *Primary Examiner.*